Figure 2:
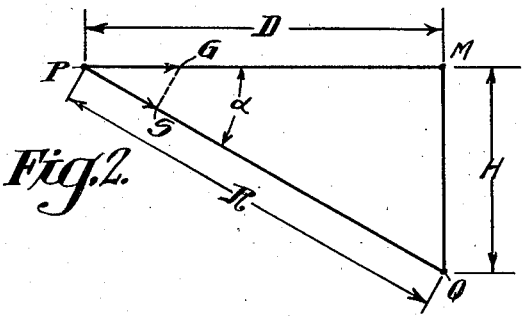

Dec. 23, 1947.  D. G. C. LUCK  2,433,284
RADIO BOMB RELEASE SYSTEM
Filed Oct. 2, 1944  3 Sheets-Sheet 1
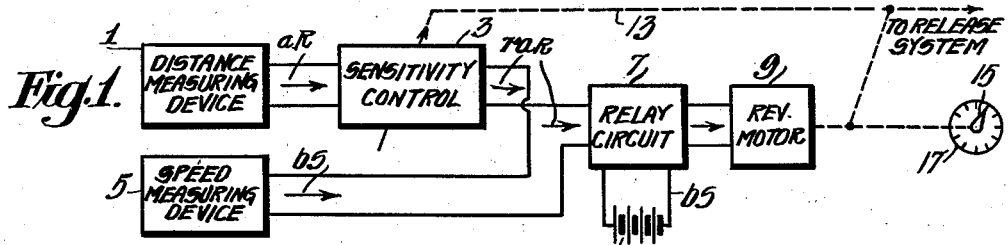
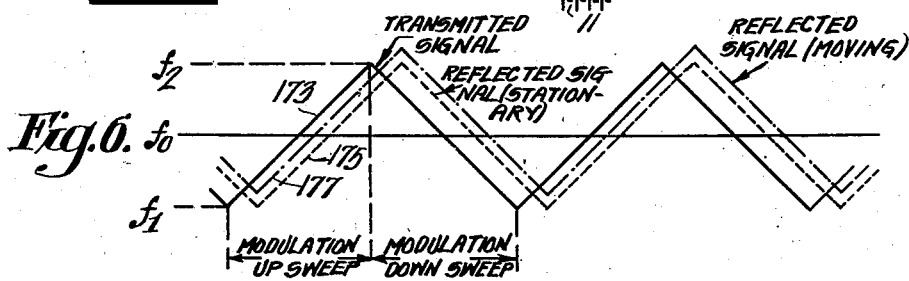
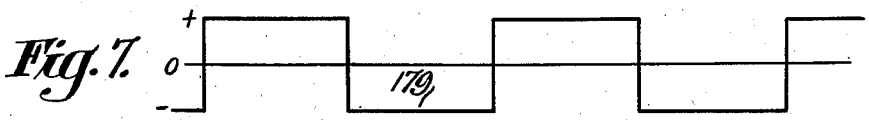
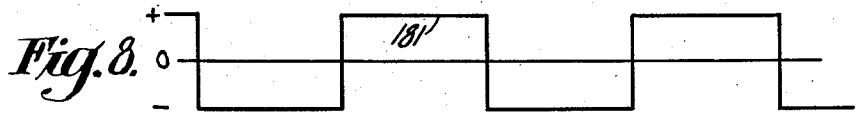
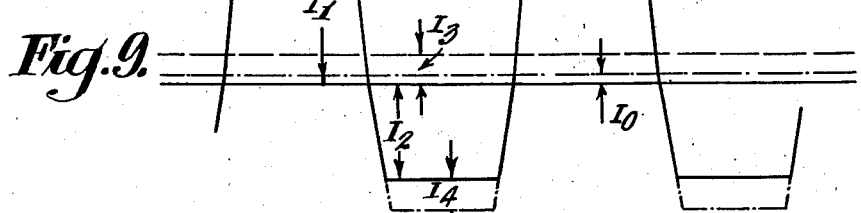
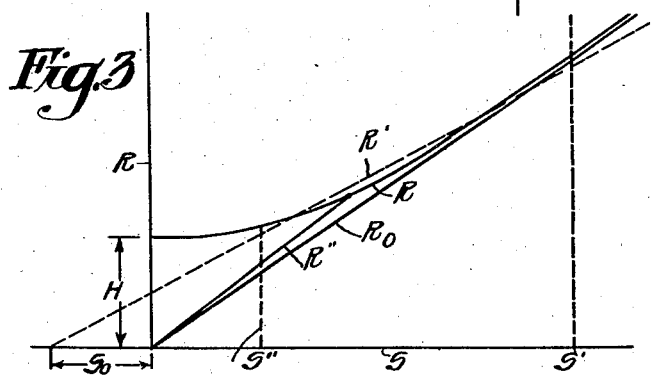
INVENTOR.
David G. C. Luck
BY
ATTORNEY

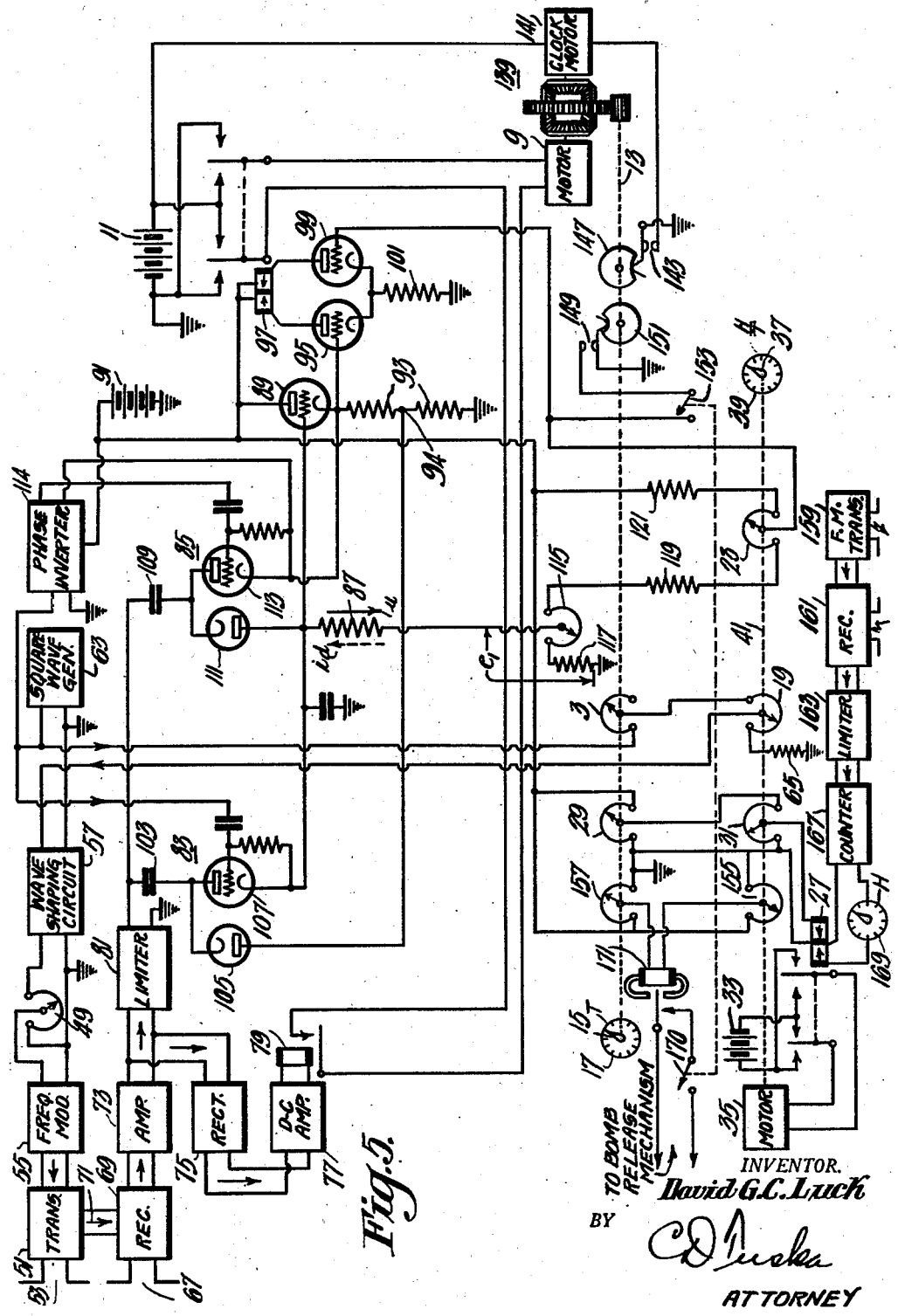

Patented Dec. 23, 1947

2,433,284

UNITED STATES PATENT OFFICE 2,433,284

RADIO BOMB RELEASE SYSTEM

David G. C. Luck, Princeton, N. J., assignor to Radio Corporation of America, a corporation of Delaware Application October 2, 1944, Serial No. 556,852

14 Claims. (Cl. 250—1.54)

This invention relates to radio bomb release systems and more particularly to improvements in systems of the time from target computing type, such as those described in Patent Number 2,416,223 issued to Royden C. Sanders, Jr., on February 18, 1947, and in copending U. S. patent application Ser. No. 547,203 filed July 29, 1944, by Royden C. Sanders, Jr., and entitled Aircraft navigation. As described in more detail hereinafter such systems operate by making substantially continuous measurements of the distance of a selected target and the speed of the bomber with respect to said target, computing the predicted time from target in response to said measurements. At a predetermined time from target, depending upon the altitude and speed of the bomber craft, a bomb is released.

Any system which measures the distance and speed of a mobile craft with respect to a target by virtue of radio waves reflected from said target will respond to the true distance and the radial component of speed, rather than the horizontal distance, that is the distance measured in a plane parallel to the surface, and the ground speed. As long as the distance of the bomber from its target is relatively great with respect to the altitude, the true, or slant, distance is substantially equal to the horizontal distance, and the slant speed of the bomber with respect to its target is substantially equal to the horizontal, or ground speed. However, as the bomber approaches a point directly over the target, these relationships no longer hold true and the time from target predicted on a ground range and ground speed basis from radio measurements of slant distance and slant speed will not approximate the actual time period which will be required for the bomber to reach the point over the target with sufficient accuracy.

In the systems described in the above-mentioned copending applications, the error resulting from the measurement of slant speed and distance rather than horizontal speed and distance are allowed for in the adjustment of release time. This allowance must be determined in accordance with the speed and altitude of the bomber, and be added to the time of fall of the bomb, which for level flight is a function of substantially only the altitude. The following discussion is based on the assumption that the bomber approaches the target in level flight.

It is the principal object of the present invention to provide means for automatically releasing a bomb.

Another object is to provide a system of the described type including means for automatically compensating the effects of altitude so as to provide an indication of the true time from target.

A further object is to provide, in a bomb release system, means for automatically compensating for the time of fall.

The invention will be described with reference to the accompanying drawings, of which Figure 1 is a schematic block diagram of a time from target system of the type described in the above-mentioned copending patent applications, Figure 2 is a geometrical diagram illustrating the relationships between the various speeds and distances involved in a typical bomb release problem.

Figure 4:
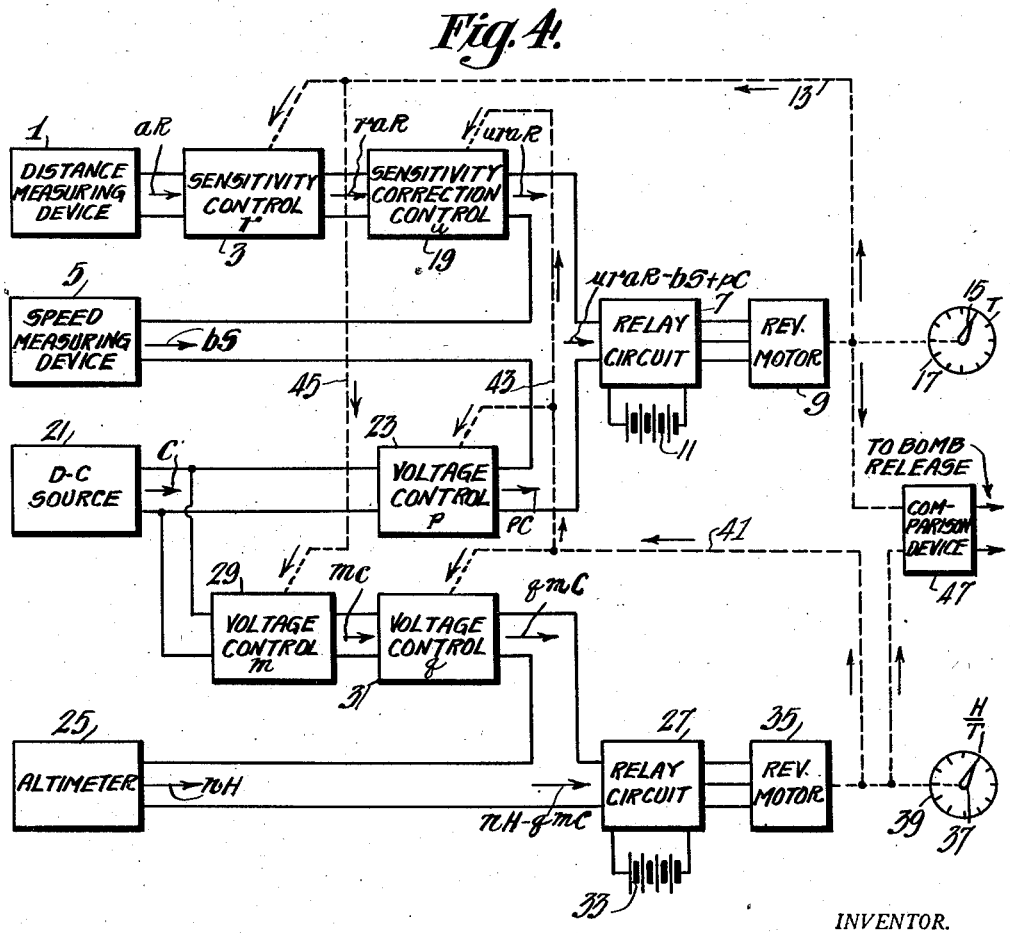

Figure 3 is a graph illustrating the relationship between slant speed and slant range of a bomber at a predetermined time from target and illustrating a linear approximation to said relationship, Figure 4 is a schematic block diagram of a bomb release system in accordance with the instant invention, Figure 5 is a schematic circuit diagram of an FM raido bomb release system embodying the present invention, and Figures 6, 7, 8 and 9 are graphs illustrating the operation of the system of Figure 5.

Referring to Figure 1, a distance measuring device 1 is arranged to provide an output voltage having a magnitude proportional to the distance of the target or objective from a craft (not shown) carrying the equipment. The device 1 may comprise radio reflection equipment, similar to that used in the well known frequency modulation type of altimeter, or any other known means for providing the required distance-proportional output. The distance measuring device 1 is provided with a sensitivity control 3, which may be merely an adjustable attenuator, or may be any other means for controlling the proportionality of the output to distance.

A speed measuring device 5, which may also be of the radio reflection type, is arranged to provide an output voltage proportional to the speed of the mobile craft with respect to the objective. The output circuits of the speed and distance measuring devices 5 and 1 are connected to a relay circuit 7, in such manner that the two outputs oppose each other. The relay circuit 7 is connected to a reversible motor 9 to control the energization thereof from a power source 11. The relay circuit 7 may include electromagnetically operated contact means, electron discharge tube means, or both, in accordance with known and conventional practice. The relay circuit 7 is adjusted so that when the polarity of the input thereto is similar to that of the output of the distance measuring device 1, the motor 9 is energized to run clockwise, for example. When the polarity of the input to the relay circuit 7 is similar to that of the output of the speed measuring device 5, the motor 9 is energized to run counter-clockwise.

The shaft of the motor 9 is mechanically coupled, as indicated schematically by the dash line 13, to the sensitivity control 3. An indicator 15, provided with a scale 17, is similarly coupled to the motor 9. The scale 17 may be calibrated in units of time, such as seconds.

In the operation of the above-described system, the distance measuring device 1 produces an output voltage $$e_d = aR$$

where R is the distance and $a$ is a constant determined by the design of the device 1. The speed measuring device 5 produces an output voltage $$e_v = bS$$

where S is the velocity and $b$ is a constant determined by the design of the device 5.

The sensitivity control 3 changes the voltage $e_d$ by a factor $r$, providing a voltage $$e'_d = raR$$

where the value of $r$ is a predetermined function of the mechanical setting, or angular position of the control shaft of the sensitivity control 3.

The voltages $e'_d$ and $e_v$ are applied, in opposition to each other, to the relay circuit 7. The resultant input to the relay circuit is thus $$e_o = raR - bS$$

As long as $e_o$ is not equal to zero, the motor 9 will be energized to drive the shaft in the proper direction to reduce the difference between the speed and distance components of the voltage $e_o$, by varying the ratio $r$. The value of $e_o$ will be substantially continuously maintained at zero by this operation, and $$raR = bS$$

Factoring and transposing:

$$\frac{R}{S} = \frac{b}{ra}$$

The quantity $$\frac{R}{S}$$

is the distance of the objective divided by the speed with respect thereto. Subject to the condition that the motion is such as to decrease, rather than increase the distance R, $$\frac{R}{S} = T$$

where T is the time from target. Thus $$T = \frac{1}{r}k$$

where $k$ is a constant and equal to $$\frac{b}{a}$$

In order that the calibration of the scale 17 may be made linear, and the angular position of the shaft be directly, rather than inversely proportional to T, the control 3 may be constructed to provide a reciprocal characteristic of $r$ vs. rotation, or as an alternative, the mechanical connection 13 may include variable ratio gearing or cam means arranged in known manner to provide reciprocal variation of $r$ as a function of input shaft rotation. However obtained, this reciprocal characteristic need only extend over the range of time T required by the application of the equipment, i. e., not necessarily from $T=0$ to $T=\infty$. The indicator 15 will assume, within the limits of the operating range, an angular position which is a predetermined linear function of T, providing direct indication upon the scale 17. The shaft of the motor 9 may be coupled also to any other device to be controlled in accordance with the time from target, T, such as a bomb release mechanism, not shown.

It will be apparent that a linear relationship between T and $r$ may be obtained also by controlling the response of the speed measuring device, rather than that of the distance measuring device. This arrangement is not illustrated in the drawing, since it involves merely the transfer of the control 3 from the output of the device 1 to that of the device 5, and modification of the control 3 to provide linear variation of sensitivity with T. The operation of the system as thus modified is identical with the operation of the system of Figure 1.

As mentioned above, the system of Figure 1 will provide correct indication of the time required for the bomber to reach a point directly above the target only under the condition that the altitude be negligible with respect to the distance. Referring to Figure 2, assume that a bomber, at present at the point P, is flying horizontally with a velocity G, at an altitude H, toward the point M, directly above a selected target situated at a point Q. The time which will be required for the bomber to reach the point M is the horizontal distance divided by the horizontal speed:

$$T = D/G$$

The quantities D and G, however, are not those measured by the devices 1 and 5. The distance measuring device 1 measures the slant range R, which is greater than the distance D, and the speed measuring device 5 measures the slant speed S, which is less than the horizontal speed G. $R/S$ is not equal to the true time from target $D/G$, but differs from it by an amount which increases as the bomber approaches the point M. At this point, the measured distance R is equal to H and the measured speed S is zero, $R/S$ indicating infinite time from target rather than zero.

Referring to Figure 3, assume temporarily that $H=0$ so that R and S are equal respectively to D and G. Then at some specified time from target $T_o$, the relationship between R and S is represented by the straight full line $R_o$. For any given value of distance R, there is a particular speed S which is required in order for the bomber to reach the target within a time $T_o$. In other words, the slope of the line $R_o$ is:

$$T_o = R/S, \text{ if } H=0$$

When there is an altitude H to be considered, the situation is illustrated by the solid curve R of Figure 3. Bearing in mind that the curve illustrates conditions pertaining only to a single specified time from target $T_o$, the curve R shows the relationship between slant speed and slant distance associated with the value $T_o$ of true time from target. The indicated time from target, representing $R/S$, varies with the slant speed S and is equal to the slope of the line $R''$, extending from the origin to the point on the curve R corresponding to the speed S. At relatively high values of S or relatively long range, the curves R and R" approach asymptotically the curve $R_o$. On the other hand, at low speeds and high altitudes, the slop of the line R" departs materially from that of the line $R_o$, resulting in serious errors in the determination of time from target by the system of Figure 1.

As a practical matter, the bomb release system will be required to operate accurately only throughout a predetermined range of values of slant speed S. Referring to Figure 3, the upper and lower limits of this speed range are indicated as S' and S". The curve R may be approximated very closely throughout this range by the straight line R', having a slope T' somewhat less than the true time from target $T_o$, and intercepting the axis of abscissae at a distance $S_o$ from the origin. The equation of this linear approximation is $$\frac{R'}{T'} = S + S_o$$

As will be shown the proper use of the approximation represented by the line R' permits mechanical determination of the true time from target $T_o$ to a high degree of accuracy throughout the ranges of altitude and speed useful in low altitude bombing.

In accordance with the present invention, it is proposed to modify the system of Figure 1 to operate upon a linear approximation such as that illustrated by the line R' of Figure 3. This is done by superimposing upon the sensitivity control 3 a correction to compensate for the difference in slope of the line R' from that of the line $R_o$, and providing in addition to the output of the speed measuring device 5 a correction bias in accordance with the intercept distance $S_o$ of the line R'. It has been found that both of said corrections are functions solely of the variable $H/T$. Accordingly, in addition to the time from target device of the system of Figure 1, an altimeter is provided and coupled thereto to provide an output proportional to $H/T$. This $H/T$ output is fed back into the time from target system to provide the necessary corrections for obtaining true time from target information. An advantage of this system is that the condition for bomb release is the following simple relation between T and $H/T$:

Neglecting air resistance, $$H = \frac{gT_f^2}{2}$$

or $$\frac{H}{T} = \frac{g}{2}\frac{T_f^2}{T}$$

where $g$ is the gravitational acceleration, 32 feet per second, and $T_f$ is the time of fall. Release must occur when time from target equals time of fall, so that at release $$\frac{H}{T} = \frac{g}{2}T_f$$

and the condition which must produce release is $$\frac{2}{g}\frac{H}{T} - T = 0$$

Referring to Figure 4, wherein elements similar to those of the system of Figure 1 are indicated by corresponding reference numerals, a sensitivity correction control device 19 is connected in cascade with the sensitivity control 3 between the control 3 and the input to the relay circuit 7.

The sensitivity control device 19 may be similar to the control 3, and operates merely to superimpose upon the effect of the control 3 another, and considerably smaller variation of sensitivity.

A D.-C. source 21 is also coupled through a voltage control device 23 to the input circuit of the relay 7, in series with the outputs of the sensitivity correction control 19 and the speed measuring device 5. The device 23 may be a voltage divider of any known type.

An altimeter 25, which may be of the F-M radio reflection type, but is in any case arranged to provide an output voltage proportional to altitude, is connected to a relay circuit 27. The relay circuit 27 may be identical with the relay circuit 7. The D.-C. source 21 is connected through two cascaded voltage control devices 29 and 31 to the relay circuit 27 in series with the altimeter 25. The control devices 29 and 31 are similar to the control 23, and are so designed as to prevent interaction due to loading of the control 29 by the control 31.

The relay circuit 27 is connected to a power source 33 and a reversible motor 35. The connections and the operation of the relay 27 and the motor 35 are similar to those of the relay 7 and the motor 9.

The motor 35 is mechanically connected to an indicator 37 provided with a scale 39, which may be calibrated in terms of $H/T$. The motor 35 is also coupled as indicated by the dash lines 41, 43, to the voltage control devices 23 and 31 and to the sensitivity correction control device 19. The motor 9 is coupled to the sensitivity control 3 as in the system of Figure 1, and is also coupled to the voltage control 29, as indicated by the dash line 45.

A comparison device 47 is coupled to the motors 9 and 35. The device 47 includes means responsive to the angular positions of the shafts of the motors 9 and 35 to close a circuit upon the attainment of a predetermined relationship therebetween, as set forth more fully below. The device 47 is electrically connected to a bomb release mechanism, not shown.

In the operation of the system of Figure 4, the distance measuring device provides an output $aR$, as in the system of Figure 1. Similarly, the speed measuring device provides an output $bS$. The D.-C. source 21 provides a constant voltage $c$. As in the system of Figure 1, the sensitivity control 3 modifies the output of the distance measuring device 1 by a factor $r$, so that the output of the device 3 is $raR$. This voltage is further modified by a factor $u$ by the correction control device 19, providing an output therefrom $uraR$. The factor $u$, as will appear hereinafter, is a quantity relating the slope of the linear approximation of Figure 3 to the true time from target. The voltage control 23 modifies the output $c$ of the D.-C. source 21 by a factor $p$, providing a voltage $pc$. The voltage $pc$ corresponds to the intercept $S_o$ of Figure 3. The total input to the relay circuit 7 is:

$$uraR - bS + pc$$

Assuming that the controls 19 and 23 remain adjusted correctly, the relay circuit 7 will energize the motor 9 as in the system of Figure 1 to drive the sensitivity control 3 to a position such that the total input to the relay circuit 7 is zero, whereupon the shaft of the motor 9 will reach an angular position corresponding to the true time from target, that is $D/G$.

As mentioned above, the correction factor $u$ provided by the control 19 and the intercept bias $p$ provided by the control 3 are both functions of H/T. Accordingly, the output shaft of the motor 35 is continuously maintained at an angular position corresponding to the quantity H/T as follows:

The voltage control 29 modifies the voltage $c$ derived from the source 21 by a factor $m$ providing an output voltage $mc$. The voltage $mc$ is further modified by the control 31 by the factor $q$ providing a voltage $qmc$. The voltage $qmc$ is applied to the relay 27 in opposition to the output $nH$ of the altimeter 25. The relay circuit 27 controls the motor 35 to drive the voltage control 31 to a position such that the total input to the relay 27 is zero, whereupon (1) $$nH - qmc = 0$$

This operation takes place concurrently with the above-described operation of the motor 9. Upon the attainment of equilibrium conditions, the factor $m$ will be proportional to the time $T$:

(2) $$m = fT$$

Substituting in Equation 1

(3) $$nH - qfTc = 0$$

and (4) $$\frac{H}{T} - \frac{qfc}{n} = 0$$

Since $f$, $c$ and $n$ are constant, Equation 4 may be rewritten as (5) $$\frac{H}{T} = Kq$$

where $$K = \frac{fc}{n}$$

Since the factor $q$ is proportional to the angular displacement of the motor 35, the operation of the system is seen to constrain this displacement to be proportional to $H/T$. Thus the correction control 19 and the voltage control 23 are positioned by the motor 35 in accordance with the magnitude of the quantity $H/T$, and within the limitations of the approximation of Figure 3, the shaft of the motor 9 assumes an angular position closely approximating the true time from target.

The comparison device 47 is adjusted, taking into consideration the various constants of the system, to operate upon the attainment of the relationship between the shafts of the motors 9 and 35 corresponding to the condition that $$\frac{2}{g}\frac{H}{T} = T$$

In practical application of the invention, it has been found desirable to combine the functions of distance measuring and speed measuring in a single system to provide time from target information without the intermediate steps of independently measuring the speed and distance. Also a "memory" system similar to that described in U. S. patent Number 2,416,223 may be included, to enable accurate operation notwithstanding momentary failure of the radio reflection signals.

Referring to Figure 5, a radio transmitter 51 is connected to an antenna 53 and to a frequency modulator 55. The modulator 55 may be of the vibratory variable capacitor type such as that described in copending application Ser. No. 471,003 filed January 1, 1943, by S. V. Perry and entitled Capacity modulator unit, or any other known device for varying the frequency of the transmitter 51 in response to a modulating voltage. The input circuit of the modulator 55 is connected through a manually adjustable voltage divider 49 to a wave shaping circuit 57 which is connected through a voltage divider, 19, a series rheostat 3 and a resistor 65 to a square wave generator 63. The rheostat 3 has a linear resistance-rotation characteristic. Since the output of the square wave generator 63 is of constant amplitude, the current through the resistor 65 and the voltage divider 19 is inversely proportional of the angular position of the movable contact of the rheostat 3.

A receiving antenna 67, similar in construction to the antenna 53 is connected to a receiver 69. The transmitter 51 is also connected to the receiver 69 through a line 71. Both antennas 53 and 67 are preferably directive, and are arranged to provide maximum response in the same direction.

The output circuit of the receiver 69 is connected to an amplifier 73. The output circuit of the amplifier 73 is connected to an amplitude limiter 81. The output circuit of the limiter 81 is connected to a switched pair of averaging cycle counter circuits, generally designated by the reference numerals 83 and 85 respectively.

The counters 83 and 85 are provided with a common load resistor 87 which is connected to the control grid of an amplifier tube 89. The anode of the tube 89 is connected directly to a D.-C. source 91. The cathode circuit of the tube 89 includes a resistor 93 tapped at an intermediate point 94. The cathode of the tube 89 is connected to the control grid of a tube 95. The anode circuit of the tube 95 includes one winding of a differential relay 97. The other winding of the relay 97 is connected in the anode circuit of a tube 99. Anode potential is applied to the tubes 97 and 99 by the source 91. The cathodes of the tubes 95 and 99 are connected to ground through a common resistor 101.

The counter 83 includes a capacitor 103 connected to the cathode of a diode 105 and to the anode of a triode 107. The cathode of the tube 107 is connected to the load resistor 87. The control grid of the tube 107 is connected to the square wave generator 63. The anode of the diode 105 is connected to the cathode circuit of the tube 89 at the point 94 on the resistor 93. The counter 85 comprises a capacitor 109 connected to the cathode of a diode 111 and to the anode of a triode 113. The anode of the diode 111 is connected to the load resistor 87. The cathode of the triode 113 is connected to the cathode of the tube 89. The control grid of the tube 113 is connected to the output circuit of a phase inverter 114, which is connected to the square wave generator 63. The lower end of the load resistor 87 is connected to the adjustable tap of a voltage divider 115, which is connected in series with fixed resistors 117, 119 and 121 and a second voltage divider 23, across the source 91. The adjustable tap of the voltage divider 23 is connected to the control grid of the tube 99.

The output circuit of the amplifier 73 is connected to a rectifier 75. The output of the rectifier 75 is applied to a D.-C. amplifier 77, which is connected to a relay 79. The amplifier 77 is biased so that the relay 79 is open in the absence of output from the amplifier 73, and is closed when the output of the amplifier 73 exceeds a predetermined value.

The relay 97 is provided with a double-throw double-pole contact arrangement connecting a battery 11 to the armature circuit of a reversible motor 9 so that when the relay armature is in one position the motor 9 is energized to run in one direction, and when the relay armature is in its other position, the motor 9 is energized to run in the opposite direction. This circuit also includes the contacts of the relay 79 so that if the received signal fails, the motor 9 is deenergized.

The operation of the system thus far described is as follows: The square wave voltage output of the generator 63 is attenuated to an extent depending upon the positions of the adjustable taps of the resistor 3 and the voltage divider 19, and applied to the wave shaping circuit 57. The wave shaping circuit 57 includes a filter or other means for modifying the square wave input to produce an output of wave shape suitable for driving the modulator 55 so as to cause triangular wave variation of frequency of the transmitter 51. The output of the wave shaping circuit 57 is further attenuated by the voltage divided 49 and applied to the modulator 55. The frequency modulated signal produced by the transmitter 51 is radiated by the antenna 53 to the target, not shown. Part of the energy striking the target is reflected to the receiving antenna 67. The received reflected signal is combined in the receiver 69 with some of the original frequency modulated signal, which is conducted directly from the transmitter 51 to the receiver 69 through the line 71. The output of the receiver 69 includes a beat signal having a frequency equal to the difference between the instantaneous frequencies of the transmitted and received signals. The beat output of the receiver 69 is amplified by the amplifier 73 and limited to a constant amplitude by the limiter 81. The output of the limiter 81 is a square wave voltage having a frequency equal to the difference between the frequencies of the transmitted and received signals and a constant amplitude $E_s$.

Referring to Figure 6, the frequency of the transmitted signal is represented by the solid line 173. This frequency varies uniformly throughout the modulation cycle in response to the triangular wave output of the wave shaping circuit 57, between upper and lower limits $f_2$ and $f_1$, respectively, about a mean value $f_0$. The sweep width $f_2-f_1$ is proportional to the amplitude of the triangular wave input to the modulator 55, and hence is a function of the position of the adjustable contacts of the voltage dividers 49 and 19, and the rheostat 3. Assuming that there is no relative motion between the bomber and the target, the reflected signal is delayed with respect to the transmitted signal by the time required for the radiation to travel from the transmitting antenna 53 to the target, and back to the receiving antenna 67. This is indicated by the dotted line 175 in Figure 2. The reflected signal varies in frequency over the same range $f_2-f_1$ as the transmitted signal, but constantly differs in frequency from the transmitted signal by an amount proportional to the distance. This difference in frequency is $$\frac{4Wf_mR}{984} \text{ cycles per second}$$

where $W=f_2-f_1$ in megacycles per second, $f_m$ is the modulation frequency in cycles per second, or frequency of operation of the square wave generator 63, 984 is the velocity of wave propagation in feet per microsecond, and R is the distance in feet. If the equipment is moving toward the target, the received signal is increased in frequency, owing to Doppler effect, by an amount $$\frac{2Sf_0}{984}$$

where S is the velocity in feet per second, $f_0$ is the carrier frequency in megacycles per second and 984 is the velocity of radiation propagation in feet per microsecond. The frequency of the received signal with relative motion is represented by the dash line 177 in Figure 2. This frequency varies throughout the modulation cycle over a frequency band which is equal in width to that of the transmitted signal. The difference in frequency between the transmitted and received signal is $$f_u = \frac{4Wf_mR}{984} - \frac{2Sf_0}{984}$$

cycles per second during increase in frequency of the transmitted signal, and $$f_d = \frac{4Wf_mR}{984} + \frac{2Sf_0}{984}$$

cycles per second during decrease in frequency of the transmitted signal.

The constant amplitude beat frequency output of the limiter 81 is applied to both of the counters 83 and 85. During the modulation upsweep, or increase in frequency of the transmitted signal, the square wave generator 63 applies a positive pulse to the control grid of the triode 107 and to the phase inverter 114, as indicated by the graph of Figure 7. The phase inverter provides a negative pulse which is applied to the control grid of the triode 113 of the counter 85, as indicated by the graph of Figure 8. The triode 113 is thereby cut off, and the counter 85 prevented from operating. The triode 107 is conductive, allowing the capacitor 103 to charge through the resistor 87 during positive half cycles of the output of the limiter 81. During negative half cycles of the limiter output, the capacitor 103 is discharged through the diode 105 to the potential appearing at the tap 94 of the resistor 93, which is slightly less than the potential at the cathode of the tube 89 and hence the cathode of the tube 107. The values of the capacitor 103 and resistor 87 are such that the capacitor 103 becomes substantially fully charged to the limiter output voltage $E_s$ during each cycle of the limiter output. Thus during the modulation upsweep, the counter 83 causes a current $i_u$ to flow downward through the resistor 87, as indicated by the solid arrow. This current is proportional to the product of the charge deposited in the capacitor 103 during each cycle, and the number of cycles per second:

$$i_u = f_u Q = f_u C_1 E_s$$

where $f_u$ is the beat frequency, Q is the charge per cycle, $C_1$ is the capacitance of the capacitor 103, and $E_s$ is the amplitude of the output of the limiter 81. Since $$f_u = \frac{4Wf_mR - 2Sf_0}{984}$$

$$i_u = \frac{4Wf_mRC_1E_s - 2f_0SE_sC_1}{984}$$

During the modulation downsweep, the square wave generator 63 provides a negative pulse at the grid of the triode 107 and the phase inverter 114, and a positive pulse at the grid of the triode 113, as indicated by the portions 179 and 181, respectively, of the graphs of Figures 7 and 8. The counter 83 is now inoperative and the triode 113 is conductive. During negative half cycles of the limiter output, the capacitor 109 is charged through the diode 111 and the resistor 87. During positive half cycles, the capacitor 109 is discharged through the triode 113 to the potential existing at the cathode of the tube 89, which is substantially equal to that at the anode of the diode 111. Thus during the modulation downsweep, the counter 85 causes an average current $i_d$ to flow upward through the resistor 87 as indicated by the dash arrow. This current is proportional to the product of the charge deposited in the capacitor 109 during each cycle, and the number of cycles per second:

$$i_d = f_d Q = f_d C_2 E_s$$

where $C_2$ is the capacitance of the capacitor 109. Since $$f_d = \frac{4Wf_mR + 2Sf_0}{984}$$

$$i_d = \frac{4Wf_mRC_2E_s + 2f_0SC_2E_s}{984}$$

The average current through the resistor 87 is $$i_0 = i_u - i_d$$

$$i_0 = \frac{4Wf_mRE_s}{984}(C_1 - C_2) - \frac{2f_0SE_s}{984}(C_1 + C_2)$$

Refer to Figure 9, wherein $I_1$ is the average component of current during upsweep due to distance, $I_2$ is the average component of current during downsweep due to distance, $I_3$ is the resultant average component of current due to distance, $I_4$ is the increase in negative average component of current during downsweep due to speed, and $I_5$ is the decrease in positive average current during upsweep due to speed. The resultant average voltage across the resistor 87 is $$e_0 = i_0 R$$

where R is the resistance of the resistor 87.

The tap of the voltage divided 115 is adjusted to apply a positive potential of, for example, 70 volts to the lower end of the resistor 87. The purpose of this arrangement is to provide a suitable operating point for the cathode follower tube 89. This voltage is denoted hereinafter as $e_1$. It may be varied over a small range by means of voltage divider 115 to provide initial adjustments of the system. The total voltage at the control grid of the tube 89, referred to ground potential, is $e_0 + e_1$. Inasmuch as the entire load of the tube 89 is in the cathode circuit, the anode current will assume a value such that the drop in said load circuit is very slightly greater than the voltage between the control grid and ground, and as a practical matter, is substantially equal to the grid voltage. Thus the voltage at the control grid of the relay tube 95, with respect to ground potential, is $e_0 + e_1$.

The differential relay 97 responds to the difference between the anode currents of the relay tubes 95 and 99. If the anode current of the tube 95 is greater than that of the tube 99, the relay 97 operates in one direction while if the current of the tube 99 is greater, the relay operates in the other direction. The relay 97 may be designed so that it will remain in its mid position when the currents of the tubes 95 and 99 are equal. A voltage $e_2$ appears at the variable tap of the voltage divider 23. This voltage is applied to the control grid of the tube 99. When $e_2$ equals $e_1 + e_0$, the control grids of the tubes 95 and 99 are at equal potentials. The anode currents are equal, and the armature of the relay 97 remains in tis central position, deenergizing the motor 9. The motor 9 is energized for operation in one direction when $e_1 + e_0$ is greater than $e_2$, and the other direction when $e_1 + e_0$ is less than $e_2$. Thus as long as there is any difference between $e_1 + e_0$ and $e_2$, the motor 9 will be energized to run in the corresponding direction.

The motor 9 is mechanically coupled to one input shaft of a differential 139. The other input shaft of the differential 139 is connected to a constant speed clock motor 141. The motor 141 is connected to the battery 11 through a switch 143. The output shaft 13 of the differential 139 carries a cam 147 arranged to open the switch 143 when the shaft 145 is in a predetermined angular position. A second switch 149 similar to the switch 143 is arranged to be operated by a cam 151, also on the shaft 13. The cams 147 and 151 are designed so that the switch 143 remains open over a slightly greater range of rotation of the shaft 13 than the switch 149. The switch 149 is connected through a manually operable switch 153 between the grid of the relay tube 99 and ground.

The above-described arrangement of the switches 143, 149 and 153 is for the purpose of resetting of the shaft 13 to its starting position, and operates as follows:

When the shaft 13 is in any other than starting position, the switches 143 and 149 are closed by the cams 147 and 151. If the switch 153 is now closed, the control grid of the tube 99 will be grounded, causing the tube 99 to draw considerably more current than the tube 95. The relay 97 is correspondingly actuated, causing the motor 9 to run continuously in one direction. The shaft 13 is driven thereby, through the differential 139, until the switch 143 opens, whereupon the clock motor 141 is stopped. Substantially at the same time, the switch 149 is opened by the cam 151, restoring the control grid of the tube 99 to its original potential $e_2$, whereupon the motor 9 is deenergized until some change occurs in the value of $e_0$.

The shaft 13 is also coupled to the movable contact of the resistor 3, and to a pair of voltage dividers 29 and 157. An indicator 15 provided with a time dial 17 is coupled to the shaft 13 as in the systems of Figures 1 and 4.

A radio altimeter of conventional design is provided, comprising an F—M transmitter 159, a receiver 161, a limiter 163, a counter 167, and a current responsive meter 169. In operation, the transmitter 159 sends a frequency modulated signal downward. The signal is reflected by the surface and received by the receiver 161, where it is compared with the transmitted signal to provide a beat signal having a frequency proportional to the altitude H. The beat signal is limited to a constant amplitude by the limiter 163 and applied to the counter 167, which operates like the counter 85, with the exception that it operates continuously rather than intermittently, to provide an output current proportional to the altitude H. This current actuates the meter 169, which may be calibrated in terms of altitude in feet.

One winding of a differential relay 27 is included in the counter output circuit, in series with the meter 169. The relay 27 is provided with a double-throw double-pole contact arrangement, connecting the battery 33 to the motor 35. The connections of the relay 27 and battery 33 and motor 35 are similar to the connections of the relay 97, battery 11 and motor 9.

The motor 35 is coupled to a shaft 41 carrying the indicator 37 which cooperates with the $H/T$ scale 39 as in the systems of Figures 1 and 4. The shaft 41 is also coupled to the voltage dividers 19 and 23, and carries in addition a pair of voltage dividers 31 and 155. The voltage divider 19 corresponds to the sensitivity correction control of the system of Figure 4. Similarly, the voltage divider 23 corresponds to the intercept bias control 23 of Figure 4, and the voltage dividers 29 and 31 correspond respectively to the voltage control devices 29 and 31 of Figure 4. The output of the voltage divider 31 is opposed in the differential relay 27 to that of the altimeter, as in the system of Figure 4 to control the motor 35. As described above, in connection with Figure 4, the system operates to position the shaft 13 in accordance with the true time from target and the shaft 41 in accordance with the quantity $H/T$.

The voltage dividers 155 and 157 are connected across the D.—C. source 91. Their adjustable taps are connected to the respective terminals of a polarized relay 171. The contacts of the relay 171 are connected to the bomb release mechanism, not shown. A disarming switch 170 is included in the circuit, and is coupled to the reset switch 153, so that when the system is disarmed, the shaft is automatically set to its starting position.

At the beginning of a bombing run toward a selected target, the arming switch 170 is closed, opening the switch 153. The time shaft 13 is at its extreme position corresponding to maximum time from target. The shaft 41 consequently is at its extreme position corresponding to minimum value $H/T$. The motors 9 and 141 are both deenergized and remain so until the signal is picked up by the receiving equipment, operating the relay 79 to close the circuit of the motor 9, rotating the shaft 13 slightly away from its maximum position. The small initial rotation of the shaft 13 closes the circuit of the clock motor 141 which thereafter drives the shaft 13 through the differential 139 so that the indicator 15 moves over the scale 17 at a rate corresponding to the passage of time. If the time from target T as determined by the radio equipment does not equal the time T indicated by the indicator 15, the relay 97 is actuated to energize the motor 9. The motion of the motor 9 is added in the differential 139 to that of the clock motor 141, setting the position of the shaft 13 to correspond to the measured time from target.

If the time from target T as determined by the radio does not remain equal to that indicated by the indicator 15, the motor 9 is again energized to provide the proper correction. As long as the indicated time corresponds to the measured time, the motor 9 is deenergized and the shaft 13 is driven only by the clock motor 141. If the reflection signal fails, the relay 79 opens, disengaging the motor 9 and the indicator will continue to function, although no corrections will be made until the signal again comes in.

As the target is approached, the shaft 13 rotates toward its minimum position while the shaft 41 rotates away from its minimum position. The calibration of the system is adjusted by means of the voltage dividers 49 and 115 so that the voltages at the taps of the voltage dividers 155 and 157 are equal when the angular positions of the shafts 13 and 41 correspond to the condition that $$\frac{2}{g}\frac{H}{T}=T$$

As explained above, this is the condition at the instant at which release should occur. Since the voltages at the movable taps of the voltage dividers 155 and 157 are equal, the resultant voltage applied to the relay 171 is zero, causing the contacts to close and actuate the release mechanism.

The invention has been described as an improved radio bomb release system wherein the slant distance, slant speed, and altitude of a bomber with respect to a target are substantially continuously measured by radio reflection means. The speed and distance information is employed to actuate a time from target shaft, and is combined with the altitude information to actuate a shaft in accordance with the quantity $H/T$. The $H/T$ information is fed back into the time from target computing system to provide correction for the error resulting from the measurement of slant speed and distance rather than horizontal speed and distance. The positions of the T shaft and the $H/T$ are compared to automatically release a bomb when the time from target is equal to the time of fall.

I claim as my invention:

1. A radio bomb release system including, on a bomber craft, radio means for transmitting signals to a predetermined target, receiving said signals after reflection by said target, and comparing said transmitted and received signals for substantially continuously measuring the slant distance and slant speed of said bomber craft with respect to said predetermined target, radio altimeter means for substantially continuously determining the altitude of said bomber craft, servo means including an output shaft and responsive to the output of said first-mentioned radio means to rotate said output shaft, further servo means including a second output shaft and responsive to the output of said altimeter to rotate said second output shaft, means responsive to the positions of both of said output shafts to bias said altimeter, further means responsive to the position of the second of said output shafts to control the distance sensitivity of said first-mentioned radio means, further means responsive to the positions of one of said output shafts to bias said first-mentioned radio means, and means responsive to the attainment of a predetermined angular relationship between said output shafts to effect release of a bomb.

2. A radio bomb release system including radio distance and speed measuring means for substantially continuously measuring the slant distance and slant speed of a bomber craft with respect to a predetermined target, radio altimeter means for substantially continuously determining the altitude of said bomber craft, a time shaft, servo means including an output shaft coupled to said time shaft and responsive to the output of said radio distance and speed measuring means to correct the position of said time shaft, further servo means including a second output shaft and responsive to the output of said altimeter to rotate said second output shaft, means responsive to the positions of said second output shaft and said time shaft to bias said altimeter, further means responsive to the positions of said second output shaft and said time shaft to control the distance sensitivity of said radio distance and speed measuring means, further means responsive to the position of the second of said output shafts to bias said radio distance and speed measuring means, and means responsive to the attainment of a predetermined angular relationship between said second output shaft and said time shaft to effect release of a bomb.

3. A bomb release system including means for substantially continuously measuring the slant distance and slant speed of a bomber craft with respect to a predetermined target, means for substantially continuously determining the altitude of said bomber craft, servo means including an output shaft and responsive to the output of said first means to rotate said output shaft, further servo means including a second output shaft and responsive to the output of said second means to rotate said second output shaft, means responsive to the positions of both of said output shafts to bias said second means, further means responsive to the positions of both of said output shafts to control the distance sensitivity of said first means, further means responsive to the position of the second of said output shafts to bias said first means, and means responsive to the attainment of a predetermined angular relationship between said output shafts to effect release of a bomb.

4. A radio bomb release system including radio means for transmitting signals from a bomber craft to a predetermined target, receiving said signals after reflection by said target, and comparing said transmitted and received signals to substantially continuously measure the slant distance and slant speed of said bomber craft with respect to said predetermined target, radio altimeter means for substantially continuously determining the altitude of said bomber craft, a time shaft, means responsive to the output of said first-mentioned radio means to rotate said time shaft, means including a second shaft and responsive to the output of said altimeter to rotate said second shaft, means responsive to the positions of both of said shafts to bias said altimeter, further means responsive to the positions of both of said shafts to control the distance sensitivity of said first-mentioned radio means, further means responsive to the position of the second of said shafts to bias said first-mentioned radio means, and means responsive to the attainment of a predetermined angular relationship between said shafts to effect release of a bomb.

5. A radio bomb release system including radio distance and speed measuring means differentially responsive to slant distance of a bomber from a selected target and slant speed of said bomber with respect to said target, servo means including an output shaft and responsive to the output of said radio means and including means responsive to the position of said output shaft for controlling the response sensitivity of said radio means to distance, whereby said output is maintained at a substantially constant value, an altimeter, further servo means including a second output shaft and responsive to the output of said altimeter and to the position of said first output shaft, means responsive to the position of said second output shaft to superimpose a second control upon said first mentioned control of said distance response sensitivity, and means responsive to the position of said second shaft to bias the output of said radio means, whereby said output approximates that which would be obtained in response to horizontal, rather than slant, distance and speed, and bomb release means responsive to the positions of both of said output shafts.

6. A radio bomb release system including radio distance and speed measuring means differentially responsive to slant distance of a bomber from a selected target and slant speed of said bomber with respect to said target, a time shaft, servo means responsive to the output of said radio means to drive said time shaft and including means responsive to the position of said time shaft for controlling the response sensitivity of said radio means to distance, whereby said output is maintained at a substantially constant value, and said time shaft rotates at substantially constant speed, an altimeter, further servo means including a second shaft and responsive to the output of said altimeter and to the position of said time shaft, means responsive to the position of said second shaft to superimpose a second control upon said first mentioned control of said distance response sensitivity, and means responsive to the position of the second of said shafts to bias the output of said radio means, whereby said output approximates that which would be obtained in response to horizontal, rather than slant, distance and speed, and bomb release means responsive to the positions of both said shafts.

7. A radio bomb release system including radio distance and speed measuring means differentially responsive to slant distance of a bomber from a selected target and slant speed of said bomber with respect to said target, a time shaft, clock means for driving said time shaft, servo means coupled to said time shaft and responsive to the output of said radio means to correct the position of said time shaft and including means responsive to the position of said time shaft for controlling the response sensitivity of said radio means to distance, whereby said output is maintained at a substantially constant value, an altimeter, further servo means including a second shaft and responsive to the output of said altimeter and to the position of said time shaft, means responsive to the position of said second output shaft to superimpose a second control upon said first mentioned control of said distance response sensitivity, and means responsive to the position of said second shaft to bias the output of said radio means, whereby said output approximates that which would be obtained in response to horizontal, rather than slant, distance and speed, and bomb release means responsive to the positions of both of said shafts.

8. A bomb release system including means differentially responsive to slant distance of a bomber from a selected target and slant speed of said bomber with respect to said target, servo means including an output shaft and responsive to the output of said first means and including means responsive to the position of said output shaft for controlling the response sensitivity of said first means to distance, whereby said output is maintained at a substantially constant value, altimeter means, further servo means including a second output shaft and responsive to the output of said altimeter and to the position of said first output shaft, means responsive to the position of said second output shaft to superimpose a second control upon said first mentioned control of said distance response sensitivity, and means responsive to the position of the second of said output shafts to bias the output of said first means, whereby said output approximates that which would be obtained in response to horizontal, rather than slant, distance and speed, and bomb release means responsive to the positions of both of said output shafts.

9. A radio bomb release system including radio distance and speed measuring means providing an output voltage of magnitude $$E_1 = uraR - bS + pc$$

wherein $a$ and $b$ are constants, $u$ and $r$ are factors depending upon adjustments of said means, R is the slant distance of a bomber from a selected target, S is the slant speed of said bomber with respect to said target, and $pc$ is a bias voltage applied to said means, altimeter means providing an output voltage $E_2 = nh - qmc$, wherein $n$ is a constant, $h$ is the altitude of said bomber craft, and $qmc$ is a bias voltage applied to said altimeter, servo means including an output shaft and responsive to the output voltage $E_1$ to rotate said shaft, further servo means including a second output shaft and responsive to the voltage $E_2$ to rotate said second output shaft, means responsive to the positions of both of said shafts to control the magnitude of said altimeter bias voltage $qmc$, whereby said second servo system substantially maintains said second shaft at an angular displacement, from a predetermined reference position, directly proportional to $h$ and inversely proportional to the displacement of said first output shaft, means responsive to the position of the second of said output shafts to control the adjustment of said radio means determining said factor $u$, and means responsive to the positions of both of said output shafts to control the magnitude of said bias voltage $pc$, whereby said output voltage $E_1$ becomes zero upon the attainment of said first output shaft of an angular position substantially corresponding to the quotient T of the horizontal distance of said bomber from said target by the horizontal speed of said bomber with respect to said target, and means responsive to the attainment of a predetermined angular relationship between the positions of said first and second output shafts to release a bomb.

10. A radio bomb release system including radio distance and speed measuring means providing an output voltage of magnitude $$E_1 = uraR - bS + pc$$

wherein $a$ and $b$ are constants, $u$ and $r$ are factors depending upon adjustments of said means, R is the slant distance of a bomber from a selected target, S is the slant speed of said bomber with respect to said target, and $pc$ is a bias voltage applied to said means, altimeter means providing an output voltage $E_2 = nh - qmc$, wherein $n$ is a constant, $h$ is the altitude of said bomber craft, and $qmc$ is a ias voltage applied to said altimeter, a time shaft, clock means for driving said time shaft, servo means coupled to said shaft and responsive to the output voltage $E_1$ to correct the position of said shaft, further servo means including a second shaft and responsive to the voltage $E_2$ to rotate said second shaft, means responsive to the positions of both of said shafts to control the magnitude of said altimeter bias voltage $qmc$, whereby said second servo system substantially maintains said second shaft at an angular displacement, from a predetermined reference position, directly proportional to $h$ and inversely proportional to the displacement of said time shaft, means responsive to the position of said second output shaft to control the adjustment of said radio means determining said factor $u$, and means responsive to the positions of both of said shafts to control the magnitude of said bias voltage $qmc$, whereby said output voltage $E_1$ becomes zero upon the attainment by said time shaft of an angular position substantially corresponding to the quotient T of the horizontal distance of said bomber from said target by the horizontal speed of said bomber with respect to said target, and means responsive to the attainment of a predetermined angular relationship between the positions of said first and second shafts to release a bomb.

11. A bomb release system including means providing an output voltage of magnitude $$E_1 = uraR - bS + pc$$

wherein $a$ and $b$ are constants, $u$ and $r$ are factors depending upon adjustments of said means, R is the slant distance of a bomber from a selected target, S is the slant speed of said bomber with respect to said target, and $pc$ is a bias voltage applied to said means, altimeter means providing an output voltage $E_2 = nh - qmc$, wherein $n$ is a constant, $h$ is the altitude of said bomber craft, and $qmc$ is a bias voltage applied to said altimeter, servo means including an output shaft and responsive to the output voltage $E_1$ to rotate said shaft, further servo means including a second output shaft and responsive to the voltage $E_2$ to rotate said second output shaft, means responsive to the positions of both of said shafts to control the magnitude of said altimeter bias voltage $qmc$, whereby said second servo system substantially maintains said second shaft at an angular displacement, from a predetermined reference position, directly proportional to $h$ and inversely proportional to the displacement of said first output shaft, means responsive to the position of said second output shaft to control the adjustment of said first mentioned means determining said factor $u$, and means responsive to the positions of both of said output shafts to control the magnitude of said bias voltage $pc$, whereby said output voltage $E_1$ becomes zero upon the attainment of said first output shaft of an angular position substantially corresponding to the quotient T of the horizontal distance of said bomber from said target by the horizontal speed of said bomber with respect to said target, and means responsive to the attainment of a predetermined angular relationship between the positions of said first and second output shafts to release a bomb.

12. A bomb release system including means providing an output voltage of magnitude $$E_1 = uraR - bS + pc$$

wherein $a$ and $b$ are constants, $u$ and $r$ factors depending upon adjustments of said means, R is the slant distance of a bomber from a selected target, S is the slant speed of said bomber with respect to said target, and $pc$ is a bias voltage applied to said means, altimeter means providing an output voltage $E_2 = nh - qmc$, wherein $n$ is a constant, $h$ is the altitude of said bomber craft, and $qmc$ is a bias voltage applied to said altimeter, a time shaft, clock means for driving said time shaft, servo means coupled to said time shaft and responsive to the output voltage $E_1$ to correct the position of said shaft, further servo means including a second shaft and responsive to the voltage $E_2$ to rotate said second shaft, means responsive to the positions of both of said shafts to control the magnitude of said altimeter bias voltage $qmc$, whereby said second servo system substantially maintains said second shaft at an angular displacement, from a predetermined reference position, directly proportional to $h$ and inversely proportional to the displacement of said time shaft, means responsive to the position of said second shaft to control the adjustment of said first mentioned means determining said factor $u$, and means responsive to the positions of both of said shafts to control the magnitude of said bias voltage $pc$, whereby said output voltage $E_1$ becomes zero upon the attainment of said time shaft of an angular position substantially corresponding to the quotient $T$ of the horizontal distance of said bomber from said target by the horizontal speed of said bomber with respect to said target, and means responsive to the attainment of a predetermined angular relationship between the positions of said first and second shafts to release a bomb.

13. The method of controlling the release of a bomb from a mobile craft to strike a selected target, comprising the steps of substantially continuously measuring the slant distance and slant speed of said craft with respect to said target, substantially continuously determining the altitude of said craft, deriving approximate time from target information from said slant speed and slant distance information, correcting said approximate time from target information in response to both said altitude and said time from target information, and effecting bomb release upon the attainment of a predetermined relationship between said altitude and said corrected time from target.

14. The method of controlling the release of a bomb from a mobile craft so as to strike a selected target, comprising the steps of providing a continuous indication of the passage of time, measuring the slant distance and slant speed of said craft with respect to said target to provide approximate time from target information, measuring the altitude of said craft, correcting said approximate time from target information in accordance with a predetermined function of said altitude, adjusting said time indication in accordance with said corrected time from target information, and effecting bomb release in response to the occurrence of a predetermined relationship between said altitude and said indicated time from target.

DAVID G. C. LUCK.